United States Patent [19]
Nicholson et al.
[11] Patent Number: 4,657,765
[45] Date of Patent: Apr. 14, 1987

[54] METHOD FOR IMPARTING SMOKE COLOR AND FLAVOR TO FOOD

[75] Inventors: Myron D. Nicholson, Lockport; John H. Beckman, Downers Grove, both of Ill.
[73] Assignee: Viskase Corporation, Chicago, Ill.

[21] Appl. No.: 744,682
[22] Filed: Jun. 14, 1985

Related U.S. Application Data

[62] Division of Ser. No. 465,924, Feb. 14, 1983, Pat. No. 4,540,613.

[51] Int. Cl.[4] .................. A22C 13/00; A23L 1/272
[52] U.S. Cl. .................. 426/250; 426/262; 426/413
[58] Field of Search .................. 426/105, 135, 262, 413, 426/265, 533, 250; 138/118.1; 428/36; 252/305

[56] References Cited

U.S. PATENT DOCUMENTS

| | | | |
|---|---|---|---|
| 3,106,473 | 10/1963 | Hollenbeck | 138/118.1 |
| 3,360,383 | 12/1967 | Rose et al. | 426/105 |
| 3,378,379 | 4/1968 | Shiner et al. | 138/118.1 |
| 3,383,223 | 5/1968 | Rose | 426/135 |
| 3,451,827 | 6/1969 | Bridgeford | 138/118.1 |
| 3,617,312 | 11/1971 | Rose | 426/135 |
| 4,196,220 | 4/1980 | Chiu | 426/105 |
| 4,359,481 | 11/1982 | Smits et al. | 426/533 |
| 4,431,033 | 2/1984 | Nicholson | 428/36 |
| 4,496,595 | 1/1985 | Nicholson | 426/135 X |
| 4,504,501 | 3/1985 | Nicholson | 426/135 X |
| 4,505,939 | 3/1985 | Chiu | 426/135 |

*Primary Examiner*—Arthur L. Corbin
*Attorney, Agent, or Firm*—Glen P. Winton

[57] ABSTRACT

A tar-depleted, concentrated liquid smoke is made that has superior flavoring and coloring abilities, low phenolic content, and a low acid content. It may also be partially neutralized to form a low viscosity, partially neutralized, tar-depleted, concentrated, liquid smoke composition. Both the partially neutralized and unneutralized compositions are suitable for use in commercial process equipment to make smoke impregnated cellulosic food casings and to impart smoke color, odor and flavor to foodstuff encased therein.

5 Claims, 5 Drawing Figures

FIG. 1
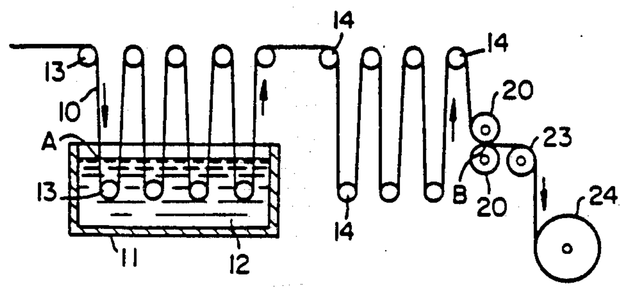
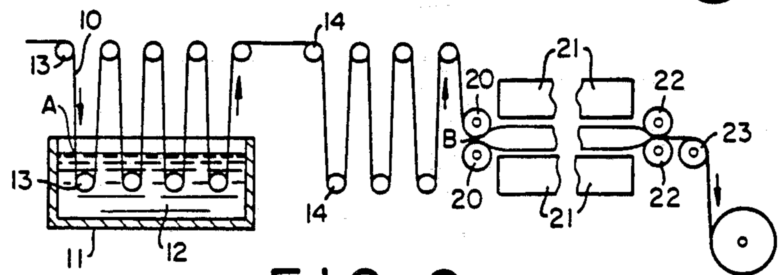
FIG. 2
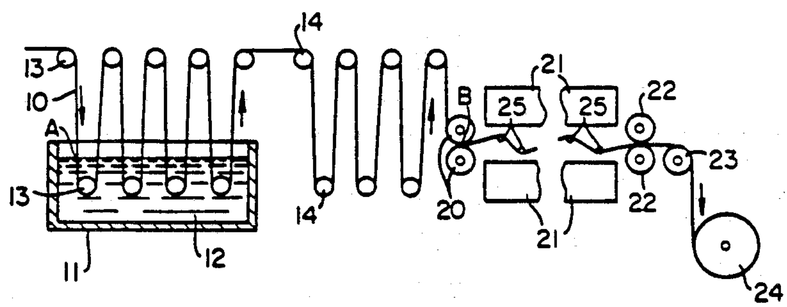
FIG. 3

METHOD FOR IMPARTING SMOKE COLOR AND FLAVOR TO FOOD

This application is a division of prior U.S. application Ser. No. 465,924 filed Feb. 14, 1983, now U.S. Pat. No. 4,540,613.

BACKGROUND OF THE INVENTION

1. Field of the Invention

This invention relates to: (a) a method for preparing a concentrated, liquid smoke from a tar-depleted, liquid smoke solution, (b) tar-depleted, concentrated liquid smoke compositions, (c) food casings colored and flavored with tar-depleted, concentrated, liquid smoke compositions, (d) a method for preparing a smoke colored and flavored foodstuff encased in a casing, (e) a method for neutralizing a tar-depleted, concentrated liquid smoke, and (f) tar-depleted, concentrated, partially neutralized liquid smoke compositions.

2. Description of the Invention

Tubular cellulosic food casings are used extensively for processing a great variety of meat products and other food items. The food casings are generally thin-walled tubing of various diameters prepared from reconstituted materials, such as regenerated cellulose. Cellulosic food casing may also be prepared with fibrous webs embedded in the wall thereof, such casings commonly being referred to as "fibrous food casings."

The many different recipes and modes of processing that are used by the processed food industry to suit different tastes, and even regional preferences, generally necessitate the use of food casings with a variety of characteristics. In some instance, for example, food casings are required to have multifunctional uses wherein they serve as containers during the processing of a food product encased therein, and then also serve as a protective wrapping for the finished product. In the processed meat industry, however, the food casings used in the preparation of many types of meat products, such as various types of sausages, such as frankfurters, bolognas and the like, beef rolls, hams and the like, are frequently removed from about the processed meat product prior to slicing and/or final packaging.

Surface appearance and flavor are important factors in the commercial and consumer acceptance of processed meat products, and a common feature of most varieties of such products involves the use of "smoking" for imparting characteristic flavor and color thereto. The "smoking" of food products is generally accomplished by the food processor subjecting the food product to actual contact with smoke in a gaseous or cloud-like form. Such "smoking" processes, however, have not been considered completely satisfactory for a variety of reasons, including the inefficiencies and lack of uniformity of the "smoking" operation. Because of the shortcomings experienced, many meat packers now employ various types of liquid aqueous solutions of wood-derived smoke constituents, commonly called "liquid smoke solutions" that have been developed and used commercially in the food processing industry for the processing of many types of meat and other food products. For convenience in this specification, these commercially available "liquid smoke" solutions in their as-purchased state will be frequently referred to herein as "as-is" liquid smoke.

The application of "liquid smoke solutions" to meat products is generally carried out in a variety of ways, including spraying or dipping an encased food product during the processing thereof, or by incorporating the "liquid smoke solution" in the recipe itself. The actual operation of "smoking" by spraying or dipping is not completely satisfactory due to inability to treat the encased product uniformly, and incorporation of "liquid smoke solution" in the meat recipe does not always provide the desired surface appearance because of dilution of smoke ingredients. Incorporation in the recipe also reduces the stability of the meat emulsion, and will adversely affect taste if high concentrations are used. Application of liquid smoke to encased food products by the food processor, such as by spraying or dipping, also causes unwanted pollution and equipment corrosion problems for the food processor. In addition, encased sausages treated by application of the liquid smoke during commercial processing have been found to yield, after peeling the casing from the treated encased food product, sausages which are lacking in smoke color uniformity from sausage to sausage, and from batch of sausages to batch of sausages. What is even more undesirable is the lack of uniformity of coloration which often appears on the surface of the individual sausages, including light and dark streaks, light and dark blotches, and even uncolored spots which especially appear at the ends of sausages.

Several methods are known for coating either the interior or the exterior of a food casing with various liquid substances designed to meet particular processing requirements, as, for example, substances that affect the adhesion properties of the casing. Some of the coatings known in the art contain a liquid smoke as a constituent thereof. However, none of these coatings applied to sausage casings have been known to impart smoke color and flavor to the food product to a suitable extent.

Known methods for coating as "as-is" type of liquid smoke solution internally in a casing have been found to be costly and also have been found to limit the speed of a continuous high speed production line.

Known methods for coating the external surface of a casing, particularly a cellulosic gel-stock casing, with "as-is" type liquid smokes, result in problems due to the tar content of these smoke solutions. That is, during the coating process, tarry deposits accumulate on the carrier rolls and the squeeze rolls of the treatment unit, which eventually forces shutdown of the treatment system.

One solution to the above-mentioned problems of imparting smoke color and flavor to a foodstuff is to use "tar-depleted" liquid smoke solutions to coat the interior or, preferably, the exterior surface of the casing. However, until recently, tar-depleted liquid smoke solutions were unavailable, and methods for making the same were unknown. As indicated above, it has been found that when a cellulosic food casing, made from a fibrous or non-fibrous gel stock, is treated with a highly acidic (pH of about 2.0 to 2.5) tar-containing, aqueous liquid smoke, tarry deposits accumulate on the carrier rolls and the squeeze rolls of the smoke treatment unit, causing the casing to stick to the rolls and eventually forcing shutdown of the unit. The acidity of the liquid smoke also may interfere with peelability of the casing by interfering with the action of the peeling aid used, such as, for example, carboxymethyl cellulose. Aqueous liquid smokes are generally very acidic, having a pH of 2.5 or less and a titratable activity of at least 3 weight percent.

It was found that tar could be removed from the liquid smoke by neutralizing the as-is liquid smoke to precipitate the tar, and that use of this neutralized, tar-depleted liquid smoke to treat a gel stock casing would eliminate the tarry deposit accumulation problem. This is disclosed in copending U.S. patent application Ser. No. 417,172, filed 14 Sept. 1982 by Nicholson, now U.S. Pat. No. 4,431,032.

Contrary to the previous belief in the art, the tar-depleted liquid smoke still possesses significant smoke coloring and flavoring capability. It has been generally believed that the tars in a liquid smoke mainly contribute to the coloring and flavoring ability of the liquid smoke. However, it has been found that this is not the case, and that other constituents of the liquid smoke, believed to be mainly the acids, the phenols and the carbonyls, have a more significant role in the coloring and flavoring ability of the liquid smoke.

One problem with the neutralizing method for forming a tar-depleted liquid smoke is that, although the liquid smoke compositions made thereby have significant coloration ability or "staining power", the coloration ability declines with increasing pH or neutralization. This limits its applicability in applications wherein a high coloration ability is desired.

Another method, using a "solvent extraction" process, may be employed to make tar-depleted liquid smoke. Such a process is disclosed in copending U.S. patent application Ser. No. 417,173, filed 14 Sept. 1982 by Nicholson, now U.S. Pat. No. 4,431,033. For example, such a process comprises contacting a tar-containing aqueous smoke solution having an absorptive power of at least about 0.25 at a wave length of about 340 nm, with either a nonreactive or reactive organic liquid solvent which has a hydrogen bonding solubility parameter of at least about 2.7 and which is immiscible in the aqueous liquid smoke solution under conditions sufficient to form a tar-enriched solvent fraction and a tar-depleted liquid smoke fraction, and separating the liquid smoke fraction to form a tar-depleted liquid smoke. Using such a solvent extraction method, it becomes possible to make tar-depleted liquid smokes having a high capability to impart smoke color, odor, and flavor, without requiring neutralization of the tar-containing liquid smoke.

The tar-depleted liquid smoke made from the solvent extraction process, unless it is neutralized, is generally highly acidic, which may also interfere with action of the peelability agents, such as certain water soluble cellulose ethers, which may be used on the casing. To alleviate this problem, the tar-depleted liquid smoke may be partially neutralized. However, since the coloration ability of the liquid smoke declines with increasing pH, the tar-depleted liquid smoke is only "partially neutralized" to a degree such that the peelability agent is not significantly affected and the coloration ability of the smoke is retained. The term "partially neutralized", as used herein, is intended to refer to liquid smoke compositions having a pH greater than about 3, preferably having a pH within the range of from about 3 to about 6.5, and even more preferably having a pH within the range of from about 3 to about 5. By providing a partially neutralized, tar-depleted liquid smoke made from a solvent extraction process, the problems due to acidity are avoided while retaining a significant degree of the coloring ability of the original as-is liquid smoke.

Unconcentrated liquid smoke compositions, whether partially neutralized or unneutralized, have been found particularly suitable for use with fibrous cellulosic food casings. When used with nonfibrous casings, it has been found that unconcentrated liquid smokes impart a smoke color, odor and flavor to the foodstuff, but not in a quantity to be sufficiently acceptable for all commercial applications. Because nonfibrous casings are thinner than fibrous casings, sufficient unconcentrated liquid smoke cannot be "coated" on, applied to, or incorporated in the wall of the casing to an extent sufficient to always impart the desired smoke color, odor and flavor to a foodstuff.

SUMMARY OF THE INVENTION

The present invention includes a method for concentrating tar-depleted liquid smoke solutions which comprises providing an unneutralized, tar-depleted liquid smoke composition made from a solvent extraction process, and concentrating the unneutralized tar-depleted liquid smoke as described below. The concentrated liquid smoke product has surprising and advantageous physical properties. It may be optionally neutralized to provide a tar-depleted, concentrated, partially neutralized, liquid smoke composition. As practiced in the prior art, when an as-is liquid smoke is concentrated, there is an increased concentration of undesirable chemical substances, for example, tars. Certain other constituents which are desirable, such as phenols, which contribute to the flavoring and coloring ability, may also become concentrated to an extent sufficient to cause an undesirably "strong" flavor. It has also been found that when a neutralized liquid smoke is concentrated, there is a significant and undesirable increase in viscosity, rendering thereby the resulting concentrated liquid smoke unsuitable for commercial use. It has, therefore, been impractical to use such concentrated smokes because of the increased tarring problem and the undesirably high viscosity that occurs when the smoke is used in a neutralized state.

By the practice of this invention, it is possible to make a concentrated liquid smoke solution that has substantially increased staining power, a low viscosity when the liquid smoke is neutralized, and a low phenolic content.

It has been found that the increase in viscosity of neutralized liquid smoke solutions resulting from the concentration thereof is in large part due to the salts of neutralization that are formed when the acids, mostly acetic acid, in the liquid smoke react with the neutralization agent. The concentration of these salts of neutralization increases proportionally with the degree of concentration, resulting ultimately in an excessive concentration of these salts and, thus, an undesirably high viscosity.

Suprisingly, it has been found that when concentrating an unneutralized, tar-depleted, liquid smoke, the acid-content is not proportionally increased, but the amount of acid in the liquid smoke decreases with the degree of concentration of the liquid smoke. That is, as the unneutralized, tar-depleted smoke is concentrated, the acids causing the viscosity difficulties are apparently volatilized to a significant degree. Thus, it is possible to make concentrated liquid smokes, while retaining a suitably low viscosity. The concentrated, liquid smoke compositions of the invention, in addition to having a low total acid content and a low viscosity when neutralized, are tar-depleted, and have the processing advantages found with unconcentrated tar-depleted liquid smokes. They also have substantially increased smoke coloring and flavoring capabilities over non-concentrated tar-depleted liquid smokes.

The higher viscosity of concentrated as-is smokes of the prior art is also due in part to the presence of the high molecular weight polymeric tar constituents in the liquid smoke composition. The low amount of tars in the tar-depleted compositions of this invention contribute to the low viscosity of both the unneutralized and partially neutralized forms.

Thus, an aspect of the present invention is a method for making a tar-depleted, concentrated liquid smoke which comprises (1) contacting an aqueous, tar-containing, unneutralized liquid smoke solution and a liquid solvent at a volume ratio between about 1:1 and about 65:1, respectively, under conditions sufficient to form a tar-enriched, liquid solvent fraction and an aqueous, tar-depleted, liquid smoke fraction, the tar-depleted, liquid smoke fraction having an absorptive power of at least about 0.15, preferably at least about 0.25, at a wave length of 340 nm, and having a light transmittance of at least about 50%, preferably about 65%, the tar-containing liquid smoke solution having an absorptive power of at least about 0.25 at a wave length of 340 nm, the liquid solvent being nonreactive with the liquid smoke solution or reactive with the liquid smoke solution to form a derivative liquid solvent, the liquid solvent being immiscible in the liquid smoke solution, the liquid solvent having a hydrogen bonding solubility parameter in the environment of the liquid smoke solution of at least about 2.7; (2) separating the tar-depleted, unneutralized liquid smoke fraction from the tar-enriched liquid solvent fraction; and (3) concentrating the tar-depleted, unneutralized liquid smoke fraction at a temperature less than about 70° C., preferably less than about 50° C., to a concentration ratio of between about 2:1 and about 5:1, preferably between about 3:1 and about 4:1, to form a tar-depleted, concentrated, liquid smoke composition having a total acid content less than about 40 weight percent, preferably less than about 35 weight percent.

In a preferred embodiment, the present invention comprises a tar-depleted liquid smoke composition having a total acid content greater than about 12 and less than about 40 weight percent, preferably less than about 35 weight percent, an absorptive power of at least about 0.15, preferably at least about 0.25, at a wave length of 340 nm, a viscosity of less than about 500 centipoise at 25° C., a carbonyl content greater than about 200 mg/ml, and a phenol content less than about 5% of the carbonyl content. Additionally, this liquid smoke composition has a pH of between about 3 and about 6.5.

In a further preferred embodiment, the present invention comprises a food casing having an absorptive index of at least 0.25 at a wave length of 340 nm and containing a tar-depleted liquid smoke composition having an absorptive power of at least about 0.15 at a wave length of 340 nm, a total acid content greater than about 12 and less than about 40 weight percent, a carbonyl content greater than about 200 mg/ml, and a phenol content less than 5% of the carbonyl content. Preferably, the casing has an absorptive index of from about 0.3 to about 0.9.

Additionally, the present invention comprehends methods of manufacturing the preferred tar-depleted liquid smoke composition and the preferred food casing which have been defined in the foregoing two paragraphs.

The present invention also includes tar-depleted, concentrated, liquid smoke compositions having a total acid content less than about 40 weight percent, preferably less than about 35 weight percent, an absorptive power of at least about 0.15, preferably at least about 0.25, at a wave length of 340 nm, and a viscosity of less than about 500 centipoise at 25° C.

The present invention also includes a method for making a tar-depleted, concentrated, partially neutralized liquid smoke composition which comprises (1) contacting an aqueous, tar-containing, liquid smoke solution and a liquid solvent at a volume ratio of from between about 1:1 and about 65:1, respectively, under conditions sufficient to form a tar-enriched, liquid solvent fraction and an aqueous, tar-depleted, liquid smoke fraction, the tar-depleted, liquid smoke fraction having an absorptive power of at least about 0.15, preferably at least about 0.25, at a wave length of 340 nm, and having a light transmittance of at least about 50%, preferably at least about 65%, the tar-containing liquid smoke solution having an absorptive power of at least about 0.25 at a wave length of 340 nm, the liquid solvent being nonreactive with the liquid smoke solution or reactive with the liquid smoke solution to form a derivative liquid solvent, the liquid solvent being immiscible in the liquid smoke solution, the liquid solvent having a hydrogen bonding solubility parameter in the environment of the liquid smoke solution of at least about 2.7; (2) separating the tar-depleted, liquid smoke fraction from the tar-enriched liquid solvent fraction; (3) concentrating the tar-depleted, liquid smoke fraction at a temperature less than about 70° C., preferably less than about 50° C., to a concentration ratio of between about 2:1 to about ;B 5:1, preferably from about 3:1 to about 4:1, to form the tar-depleted, concentrated, liquid smoke composition; and (4) neutralizing the tar-depleted, concentrated, liquid smoke composition to a pH greater than 3, preferably between about 3 and about 6.5, more preferably between about 3 and about 5, to form a tar-depleted, concentrated, partially neutralized liquid smoke composition, the tar-depleted, concentrated, partially neutralized, liquid smoke composition having a viscosity less than about 500 cp, preferably less than about 250 cp, at 25° C.

The present invention also includes a tar-depleted, concentrated, partially neutralized, liquid smoke composition having a viscosity less than about 500 cp, preferably less than about 200 cp, at about 25° C., a pH greater than 3, preferably between about 3 and about 6.5, an absorptive power of at least about 0.25, at a wave length of 340 nm; and a total acid content less than about 40 weight percent, preferably less than about 35 weight percent.

The present invention also comprises a food casing that is colored and flavored by a concentrated liquid smoke composition wherein the wall of said casing contains smoke color and flavor constituents and has an absorptive index of at least about 0.25, preferably between about 0.3 and about 0.9, at a wave length of 340 nm.

The present invention also includes a method for making a food casing that is colored and flavored by a liquid smoke composition that comprises treating a surface of a tubular food casing with any of the concentrated liquid smoke compositions of this invention, either unneutralized or partially neutralized, in a sufficient quantity such that the wall of the casing contains smoke color and flavor constituents and has an absorptive index of at least 0.25, preferably between about 0.3 about 0.9, at a wave length of 340 nm.

The present invention also includes a method for imparting a smoke odor, color, and flavor to a foodstuff which comprises treating a surface of a tubular food casing with any of the concentrated liquid smoke compositions of this invention, either unneutralized or partially neutralized, in a sufficient quantity such that the wall of the casing contains smoke color and flavor constituents and has an absorptive index of at least 0.25, preferably between about 0.3 and about 0.9, at a wave length of 340 nm; stuffing the casing with foodstuff and processing the casing with the foodstuff therein under conditions sufficient to transfer smoke color and smoke flavor constituents from the casing to the encased foodstuff.

BRIEF DESCRIPTION OF THE DRAWINGS

FIG. 1 is a schematic view of apparatus suitable for treatment of the external surface of a food casing with the liquid smoke composition of this invention.

FIG. 2 is a schematic view of apparatus similar to and performing the same functions as the apparatus of FIG. 1, but with a chamber for partially drying the casing treated with the liquid smoke composition of this invention to a desired moisture content while in an inflated condition.

FIG. 3 is a schematic view of apparatus similar to and performing the same function as the apparatus of FIG. 2, but with means for partially drying of the casing treated with the liquid smoke composition of this invention while in a flat condition.

DETAILED DESCRIPTION OF THE INVENTION

Figure 4:
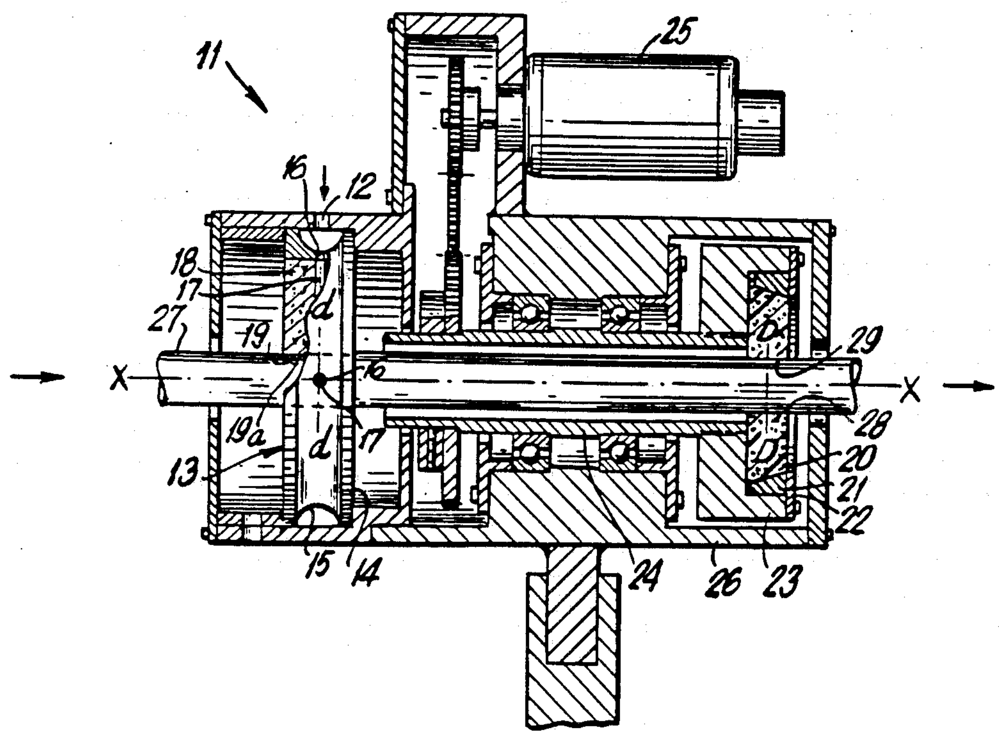
FIG. 4 is an elevation view, with certain parts in cross-section, of an absorbent-type liquid appicator-smoother assembly useful for coating the tar-depleted, concentrated liquid smoke solutions of the invention upon a casing.

As used in this specification and the appended claims, the following terms are defined as follows:

"Solution" is meant to encompass homogeneous true solutions, as well as emulsions, colloidal suspensions, and the like.

"Smoke color, odor, and flavor constituents", refers to the smoke color, odor and flavor constituents present in natural wood derived liquid smoke solutions.

"Absorptive power" is a measure of the coloring capability of the liquid smoke solution. Absorptive power is measured by placing 10 mg of a liquid smoke solution to be tested (either tar-containing liquid smoke or tar-depleted liquid smoke) in a disposable vial and mixing 5 ml of methanol therewith. The ultraviolet absorption value of the mixture is then measured at a wavelength of 340 nm, and this value is the absorptive power. It should be noted that whereas tar content is a significant contributor to the absorptive power measurement, tar only contributes to the staining of food in a minor way, if at all. Thus, in commerically available as-is smoke solutions, absorptive power includes a measurement of the tar-content and of the coloring constituents such as carbonyls, phenols and acids. This means that the absorptive power of as-is smoke solutions and tar-depleted smoke solutions may be used to comparatively rank them in smoke coloring ability. However, the absorptive power of an as-is liquid smoke solution cannot be numerically compared with the absorptive power of a tar-depleted smoke solution because of the absorptive effect of tars.

"Absorptive index" is a measure of the coloring ability of a casing treated with a liquid smoke solution. It is measured by cutting out 2 square inches (12.9 square centimeters) of the casing to be tested and placing the cut-out portion in 10 ml of methanol. After about 1 hour of soaking time, the methanol has extracted all of the smoke components out of the casing. The ultraviolet absorption value of the resulting smoke component-containing methanol is determined at a wave length of 340 nm, and this value is the absorptive index.

The concentrated liquid smoke compositions of the invention have a total acid content of less than about 40 weight percent, and preferably less than about 35 weight percent. "Total acid content" refers to the concentration of acids, principally acetic acid, that are present in the liquid smoke. It is reported as weight percent and since acetic acid is the principal acid in liquid smoke, the weight percent is based on equivalents of acetic acid. These values for total acid content refer to tar-depleted, concentrated, liquid smoke compositions made from as-is liquid smoke compositions having an acid content of between about 11 and about 13 weight percent. While it is contemplated as within the scope of this invention that as-is liquid smoke solutions having a lower acid content can be used in the method of this invention, for economical reasons as-is liquid smokes having an acid content between about 11 and 13 weight percent are preferred. If an as-is smoke having a lower acid content is used, the expected acid content of the inventive concentrated liquid smoke composition at the same concentration ratio would be proportionally less.

Total acid content is measured by the following procedure:

1. Weigh accurately about 1 ml of liquid smoke (filtered if necessary) in a 250 ml beaker,
2. Dilute with about 100 ml of distilled water and titrate with standard 0.1N NaOH to a pH of 8.15 (as measured on a pH meter),
3. Calculate the total acid content as weight percent of acetic acid (HAc), using the following conversion;

$$1 \text{ ml } 0.1000\text{N NaOH} = 6.0 \text{ mg HAc}$$

This method can be used to measure total acid content of tar-containing liquid smokes and tar-depleted liquid smoke solutions that have not been neutralized.

In practice of the invention, a solvent extraction process is used to provide a tar-depleted liquid smoke fraction. The tar-depleted, liquid smoke fraction comprises a composition derived from an as-is aqueous liquid smoke solution and it contains smoke color, odor and flavor constituents. It has an absorptive power of at least about 0.15 at a wave length of 340 nm, and it has a light transmittance of at least about 50%. The tar-depleted liquid smoke fraction is prepared by contacting the tar-containing, aqueous liquid smoke solution with suitable nonreactive or certain reactive organic solvents, as hereinafter described, to extract the tars therefrom.

The tar-containing aqueous liquid smoke solutions useful in the invention include commercially available as-is liquid smoke solutions. The tar-containing aqueous liquid smoke solutions should have an absorptive power of at least about 0.25 at a wave length of 340 nm. Suitable liquid smoke solutions are generally produced by the limited burning of wood, generally hardwood, and the absorption of the smoke so generated into an aqueous solution under controlled conditions. The limited burning keeps some of the undesirable hydrocarbon compounds of tars in an insoluble form, thereby allowing removal of these constituents from the final liquid smoke. Thus, by this procedure, the wood constituents previously considered desirable by the manufacturers of liquid smoke are absorbed into the solution in a balanced proportion and the undesirable constituents may be removed. Alternately, the tar-containing liquid smoke solution may be derived from the destructive distillation of wood, that is, the breakdown or cracking of wood fibers into various compounds which are distilled out of the wood char residue. The liquid smoke solution, resulting from either of the above processes, still contains a significant concentration of soluble tars because the manufacturers and users of liquid smoke consider the dark colored tars to be necessary from the standpoint of imparting smoke color, odor, and flavor to foodstuffs. This type of smoke solution is representative of the whole spectrum of wood-derived smoke colors and flavors that are available. The preferred apparatus and method for manufacturing typical liquid smoke solutions used in the invention are described in U.S. Pat. No. 3,106,473, issued Oct. 8, 1963 to Hollenbeck, and U.S. Pat. No. 3,873,741 issued Mar. 25, 1975 to Melcer et al.

The light transmittance is measured for water-liquid smoke mixtures. This measured light transmittance (relative to pure water) is inversely related to tar-content of the tested liquid smoke, i.e. a high tar-content results in a cloudy liquid with low light transmittance. The procedure for measuring light transmittance is to thoroughly mix a 1 ml aliquot of the liquid smoke with 10 ml of water, and determine its turbidity-transmittance on a spectrophotometer using a light wavelength of 590 nm. The higher the percent transmittance reading, the lower the residual tar concentration in the liquid smoke composition. The desired light transmittance for a tar-depleted liquid smoke solution may be achieved by selection of the solvent and also by controlling the volume ratio of as-is liquid smoke solution to solvent, as shall be described more fully hereinafter. In general, the highest levels of light transmittance are achieved with the greatest quantity of solvent relative to liquid smoke.

The organic liquid solvent used in the invention should be immiscible in the tar-containing liquid smoke solution and have a hydrogen bonding solubility parameter in the liquid smoke environment of at least about 2.7. The organic liquid solvent may be either nonreactive with the tar-containing liquid smoke or reactive with the tar-containing liquid smoke solution to form a derivative liquid solvent. If reactive, the derivative liquid solvent should also have the same solvent properties as described above.

The hydrogen bonding solubility parameter, as used herein, can be calculated from known literature or experimental vapor pressure data such as the heat of vaporization at 25° C. The total solubility parameter ($\delta_T$) may be determined by using the relation of Equation (1).

$$\delta_T = \left[ \frac{(\Delta H_{25} - RT)d}{M} \right]^{\frac{1}{2}} \quad (1)$$

where:

$\Delta H_{25}$ = Heat of vaporization at 25° C.,
R = Gas constant,
T = Temperature, Degrees Kelvin
d = Density at 25° C., and
M = Molecular weight.

The total solubility parameter value can be separated into its hydrogen bonding ($\delta_H$), polar ($\delta_P$), and nonpolar ($\delta_{NP}$) constituents. The following relationships are useful for determining the hydrogen bonding parameter value ($\delta_H$).

$$\log\alpha = 3.39066\frac{T_b}{T_c} - 0.15848 - \log\frac{M}{d} \quad (2)$$

$$\delta_H = \delta_T\sqrt{\frac{\alpha - 1}{2}} \quad (3)$$

where:

$\alpha$ = Aggregation number,
$T_b$ = Boiling point in degrees absolute, and
$T_c$ = Critical temperature in degrees absolute.

The theoretical basis for use of solubility characteristics is discussed in the literature. Tabulation of parameters have been published in "The Three Dimensional Solubility Parameter and Solvent Diffusion Coefficient, "Danish Technical Press, 1967, Copenhagen, by C. M. Hansen. A list of solubility parameters can be obtained from K. L. Hoy, "Tables of Solubility Parameters", Union Carbide Corporation, 1975, obtainable from Union Carbide Corporation, River Road, Bound Brook, N.J. 08805.

Suitable organic solvents include halogen di- or tri-substituted methanes, such as methylene dichloride, bromochloromethane, and the like; chloroform, bromoform, and the like; acetophenone; and non-halogenated alcohol liquids such as 2-ethylhexanol, the phenyl ether of ethylene glycol, the monohexyl ether of ethylene glycol, n-octyl alcohol, n-hexyl alcohol, and n-butyl alcohol. The preferred solvent is methylene dichloride ($CH_2Cl_2$).

The tar-containing, aqueous, as-is liquid smoke and the liquid organic solvent are contacted at a volume ratio of liquid smoke to liquid solvent of from between about 1:1 and about 65:1, respectively, and under extraction conditions to form a tar-enriched liquid solvent fraction and a tar-depleted aqueous liquid smoke fraction. The exact ratio used will depend on the particular solvent used and the light transmittance desired for the tar-depleted liquid smoke fraction. Generally, a lower ratio of liquid smoke to solvent is used to achieve a lower tar content in the aqueous smoke product, and thereby obtain a higher light transmittance.

The method of contacting the solvent and the liquid smoke can be any suitable method known for solvent extraction and may include more than one extraction stage. The contacting may occur under ambient conditions or under elevated pressure and temperature conditions. Methods that may be used include those using liquid-liquid cyclones, centrifugal contactors, or countercurrent columns, including spray towers, packed columns, decked columns containing sieve trays or modified bubble trays, and columns with internal agitation such as rotary disc columns.

After formation of the tar-enriched solvent fraction and the tar-depleted liquid smoke fraction, the fractions are separated by any of several methods well-known to those skilled in the art. These methods include filtration, gravity decanting, liquid cycloning, and centrifugal decanting.

The tar-depleted, liquid smoke fraction useful in the invention has smoke coloring and flavoring ability, and has an absorptive power of at least about 0.15 at a wave length of 340 nm, a light transmittance of at least 50%, preferably at least 65%, and a pH of less than about 3.

The tar-depleted, liquid smoke fraction is then concentrated at a temperature of less than about 70° C., and preferably less than about 50° C. It has been found that if the tar-depleted liquid smoke fraction is heated to a temperature above the indicated range, the smoke flavoring and coloring ability of the product is deleteriously affected. In addition, the tar content of the tar-depleted, liquid smoke fraction is increased to an undesirable degree when heated above the indicated temperatures. It is believed that this is due to temperature catalyzed polymerization reactions of the phenols in the tar-depleted, liquid smoke fraction.

The method of concentration may be any suitable method wherein a suitably low temperature, as explained above, is maintained. Typically, concentration is accomplished using evaporation. Examples of evaporation methods are summarized in PERRY'S CHEMICAL ENGINEERING HANDBOOK, 4th Edition, pages 11-24 to 11-29. In order to maintain a suitable temperature and evaporation rate it may be desirable to do the evaporation under reduced pressure. Suitable methods for evaporation are well known and evaporators and related equipment are readily available. For concentration on a laboratory scale, the liquid smoke can be concentrated by a forced draft of air over a large surface of the liquid smoke. On a commercial scale, suitable methods include, but are not restricted to, forced-circulation evaporators, long-tube vertical evaporators, preferably of the falling film type, and agitated film evaporators. The process of the forced-circulation evaporator basically involves the forced circulation of the fluid, through pumping, past a heating element, such as heat-exchanger tubes supplied with a heat exchanger fluid. Preferably, the forced-circulation evaporator is of the submerged-tube type, wherein the heating element is exposed only to the liquid phase. A long-tube vertical evaporator involves the use of a long vertical heat exchanger-surface along which the liquid to be evaporated is passed. Generally, the vaporizing surface is the inner surface of heat-exchanger tubes, which are preferably oriented vertically and supplied on the outer surface with a heating fluid, which is provided at a controlled temperature predetermined not to allow vaporization to occur at the level of thermal instability of the liquid smoke. In the falling-film type of evaporator, the liquid to be vaporized is fed to the tops of the tubes and flows down the inner walls of the tubes as a film, where it is heated and concentrated through evaporation. The agitated-film or wiped-film evaporator has a heating surface comprising the inner surface of one relatively large diameter tube that may be straight or tapered. Liquid is spread on the heating surface using wipers, which maintain a close clearance to the tube wall or actually ride on the film of liquid on the wall.

Various methods of concentrating by reduction of the water component of the liquid smoke solution may be employed including, but not limited to vaporization by room temperature evaporation in a low humidity environment. Other methods of concentration which may be employed include among others, "freeze drying" and "spray drying".

The tar-depleted liquid smoke of the present invention is concentrated to a concentration ratio of from about 2:1 to about 5:1, and preferably from about 3:1 to about 4:1. The concentration ratio, as used herein, is the weight of the tar-depleted liquid smoke fraction divided by the resulting weight of the unneutralized, tar-depleted, concentrated liquid smoke. In order to obtain a tar-depleted, concentrated, partially neutralized liquid smoke having a low viscosity, the tar-depleted liquid smoke fraction to be concentrated should be unneutralized. Concentrating a prior neutralized liquid smoke composition results in a concentrate of high viscosity. A high viscosity is generally undesirable since it interferes with processing methods used to apply the liquid smoke to the casing. The finding that neutralized concentrates having a low viscosity can be formed by the method of this invention, is both unexpected and surprising.

After the tar-depleted liquid smoke is concentrated in the above described manner, the resulting concentrate is optionally partially neutralized to an extent such that the pH is greater than about 3, preferably between about 3 and about 6.5, and more preferably between about 3 and about 5. The temperature is controlled during the partial neutralization so that the temperature of the liquid smoke does not rise above about 40° C., and preferably does not rise above about 30° C.

The partial neutralization of the unneutralized, tar-depleted, concentrated, liquid smoke of the invention may be accomplished by mixing either a highly alkaline solid with the tar-containing liquid smoke, as for example $CaCO_3$, $NaHCO_3$, KOH, $Ca(OH)_2$, $Na_2CO_3$, soda-lime mixture, and NaOH pellets or flake, or by mixing the liquid smoke with a high pH liquid such as aqueous NaOH solution. Although, the carbonate and bicarbonate solids produce violent foaming, which may cause operational difficulties, the neutralization reaction of the acids in the liquid smoke with bicarbonate is endothermic, which may eliminate the need for temperature control during the neutralization.

The rate of addition of the neutralizing material to the tar-containing liquid smoke depends on the cooling capacity of the mixing container as well as the efficiency of the mixing means, as will be understood by those skilled in the art. The coloring ability of the tar-depleted, concentrated, partially neutralized liquid smoke is not substantially affected by temperature variations during the at least partial neutralization step, as long as the temperature of the bulk liquid is maintained below about 40° C., and preferably below about 30° C.

The mixing container should be cooled by indirect means, as for example, brine circulating through immersed coils in a closed-circuit refrigeration system. The reason for indirect rather than direct contact between the refrigerant and the liquid smoke is to avoid contamination of the latter.

Another possible method for at least partially neutralizing the tar-depleted, concentrated liquid smoke is by contacting the latter with an ion-exchange material.

The tar-depleted, concentrated liquid smoke composition of this invention, whether unneutralized or neutralized, is then applied to a food casing. The food casings that are suitable for use in the invention are tubular casings, and preferably tubular cellulosic casings, that are prepared by any one of the methods well known in the art. Such casings are generally flexible, thin-walled seamless tubing formed of regenerated cellulose, cellulose ethers such as hydroxyethyl cellulose, and the like, in a variety of diameters. Also suitable are tubular cellulosic casings having a fibrous reinforcing web embedded in the wall thereof, which are commonly called "fibrous food casings", as well as cellulosic casings without the fibrous reinforcement, herein referred to as "nonfibrous" cellulosic casings.

Casings conventionally known as "dry stock casings" may be used in the practice of this invention. Such casings generally have a water content within the range of from about 5 to about 14 weight percent water for nonfibrous casings, or from about 3 to about 8 weight percent water for fibrous casings, based on the total weight of the casing including water.

Casings conventionally known as "gel stock casings" are casings which have higher moisture contents than the aforementioned casings since they have not been previously dried. Such casings may also be used in the practice of this invention. Gel stock casings, whether fibrous or non-fibrous, are the type exhibiting the aforementioned tarring problem when treated by as-is, tar-containing liquid smoke.

The tar-depleted, concentrated liquid smoke solution of the invention, whether unneutralized or neutralized, may be applied to the outer surface of the tubular casing by passing the casing through a bath of the liquid smoke solution. The liquid smoke is allowed to soak into the casing prior to doctoring off any excess liquid smoke by passing the casing through squeeze rolls or wipers, and the like, for an amount of time sufficient for the casing to incorporate the desired amount of smoke coloring and smoke flavoring constituents. The process of passing the casing through a treatment bath, also referred to in the art as a "dip bath" or a "dip tank," may also be referred in the art as a "dipping" step. The liquid smoke of the invention may alternatively be externally applied to the casing by methods other than dipping, such as spraying, brushing, roll-coating, and the like.

Alternatively, the tar-depleted, concentrated, liquid smoke composition may be applied to the internal surface of the casing by any of several well-known procedures such as those described in U.S. Pat. No. 4,171,381, issued Oct. 16, 1979 to Chiu. These include slugging or bubble coating, spraying, and coating while shirring. The slugging method for coating the inside of a casing involves filling a portion of the casing with the coating material, so that the slug of coating material generally resides at the bottom of a "U" shape formed by the casing being draped over two parallel rollers, and then moving the continuous indefinite length of casing so that the slug of coating material remains confined within the casing, while the casing moves past the slug and is coated on its inside wall by the coating material contained within the slug.

The coated casing may be shirred by conventional methods, or prior to shirring, it may be dried and/or humidified to a water content suitable for shirring and/or further processing. The need for conventional drying and/or humidification after treatment with the liquid smoke compositions of this invention depends on the water content of the casing after treatment and the type of casing. If the casing is a nonfibrous casing, a water content within the range of from about 8 weight percent to about 18 weight percent water immediately before shirring is typical, and for fibrous casings a water content within the range of from about 11 weight percent to about 35 weight percent water immediately before shirring is typical, where the percentages are based on the total weight of casing including water.

One method of treating the casing with the smoke solution of the invention is shown in FIG. 1. In FIG. 1 a flattened, tubular, cellulosic sausage casing 10, is externally treated with the smoke composition of the invention during its passage over lower and upper guide rolls 13 through dip tank 11 which contains the liquid smoke solution 12 of the invention. The casing passes over lower and upper guide rolls 14 after exiting the dip tank, and then passes between squeeze rolls 20 which minimize any excess carry-over of the liquid smoke composition. The total contact time of the casing 10 with the liquid smoke solution 12 in the dip tank 11, and the time during which excess liquid smoke composition adheres on the casing before it passes through the squeeze rolls 20, will determine the amount of smoke coloring and smoke flavoring constituents of the tar-depleted, concentrated, liquid smoke composition that the casing will incorporate. The total contact time is measured from point A to point B in FIG. 1. After the casing passes through squeeze rolls 20, it passes over guide roll 23 and is wound up on roll 24. The casing is then sent on to further conventional processing, including conventional humidification, as may be required, and conventional shirring.

The embodiment illustrated in FIG. 2 differs from that illustrated in FIG. 1 in that in FIG. 2 the casing after passing through squeeze rolls 20 is passed into a heating and drying chamber 21, wherein it is dried to the proper moisture content. The casing is inflated by a bubble of air maintained in a relatively fixed position between squeeze rolls 20 and 22 by the sealing action of rolls 20 and 22. The heating chamber 21 can be any type of heating device, such as circulating hot air chambers, which will dry the sausage casing to the proper moisture content. After the casing passes out of the heating chamber 21 and through squeeze rolls 22, it passes over guide roll 23 and is wound up on roll 24. The casing is then sent on to conventional further processing, including conventional humidification, as may be required, and conventional shirring.

The embodiment illustrated in FIG. 3 differs from that illustrated in FIG. 2 in that in FIG. 3 the casing is dried in a flat condition while passing over guide rolls 25.

The preferred method for applying the tar-depleted, concentrated liquid smoke solutions of the invention is a method wherein the exterior wall of a casing is coated by moving the casing through an inner opening of a first flexible and resilient means, which displaces the opening edge while liquid is applied by rubbing contact. The liquid coating is then smoothed by movement through the inner opening of a rotating second flexible and resilient means. This method and an apparatus incorporating this method are described in U.S. Pat. No. 4,356,218, issued on Oct. 26, 1982, to Chiu.

Therein the apparatus is described as an apparatus for liquid coating the exterior wall of an inflated flexible tubing during its longitudinal movement comprising: (a) first flexible and resilient means with an inner circular opening having slightly smaller diameter than the diameter of the inflated flexible tubing exterior wall, the first means being transversely positioned relative to the tubing axis and arranged such that the inflated flexible tubing may be moved in its longitudinal direction through said inner circular opening, so as to displace the circular opening edge while maintaining rubbing contact therewith; (b) means for supplying said liquid to said first means (a) for distribution thereby, so as to be applied to the longitudinally moving inflated flexible tubing exterior wall during said rubbing contact; (c) second flexible and resilient means with an inner circular opening, the second means being rotatable around the opening center and the opening having slightly smaller diameter than the diameter of the inflated flexible tubing exterior wall, said second means being transversely positioned relative to the tubing axis and adjacent to but spaced downstream from the first means (a) with respect to the longitudinally moving tubing such that the tubing with the coating on its external wall may be moved through said inner circular opening of said second means so as to displace the rotating circular opening edge while maintaining rubbing contact therewith for smoothing the applied liquid on the tubing exterior wall as a film of uniform thickness; and (d) means for rotating said second means (c) around the tubing axis during its longitudinal movement through said second means so as to maintain said rubbing contact while smoothing said liquid into a continuous film of substantially uniform thickness on the tubing exterior wall.

The method is described as a method for coating the exterior wall of a longitudinally moving inflated flexible tubing with liquid comprising the steps of (a) continuously moving the inflated flexible tubing in the longitudinal direction along a straight line; (b) providing first flexible and resilient means with an inner circular opening of slightly smaller diameter than the diameter of the inflated tubing exterior wall; (c) supplying liquid to said inner circular opening of the first means; (d) moving said inflated tubing through said inner circular opening of said first means and maintaining rubbing contact with the opening edge so as to displace said opening edge and simultaneously apply said liquid to, and distribute the applied liquid around, the inflated tubing exterior wall; (e) providing second flexible and resilient means with an inner circular opening of slightly smaller diameter than the diameter of the inflated tubing exterior wall; (f) rotating said second means around its centerline axis; and (g) moving said inflated tubing with said liquid applied on its exterior wall through the rotating second means inner circular opening and maintaining rubbing contact with the opening edge so as to displace said opening edge while simultaneously smoothing the liquid coating as a continuous film of substantially uniform thickness on the tubing exterior wall.

In FIG. 4 is shown an embodiment of the apparatus described in above-cited U.S. Pat. No. 4,356,216. In FIG. 4 liquid applicator-smoother assembly 11 is provided for coating of an inflated flexible cellulosic tubing moving therethrough in a horizontal direction from left to right. The inflated flexible tubing external surface is coated with wood-derived liquid smoke which, for example, may be pumped to an elevated pressure, such as 20–25 psig (138–172 kilopascals), and introduced through liquid inlet port 12 into and around the annular liquid distribution applicator ring assembly 13. Assembly 13 includes applicator support member 14 having grooved annular distribution ring 15 in its outer edge. Multiple (e.g. four) liquid inlet tubes 16 are positioned at preferably equal intervals around distributor 15, and a slightly larger diameter flexible distribution tube 17 is positioned around the inner end of each inlet tube 16. The inner wall of flexible tube 17 and the outer wall of inlet tube 16 are preferably sized to form a press fit for support of tube 17. Positioned within support member 14 is a ring formed of absorbent material 18 as the aforementioned first flexible and resilient means. A preferred absorbent material is an open-celled polyurethane foam, as for example "Omalon 9," manufactured by the Olin Corporation (120 Long Ridge Road, Stamford, Conn. 06904). This particular foam has "Wicking Capability". In general, "Wicking Capability" is the ability of an absorbent material to soak up a liquid.

From annular distributor ring 15 the liquid flows very evenly through each inlet tube 16 because of the substantial pressure drop. As illustrated, the four flexible inner distribution tubes 17 are positioned within and entirely enclosed by the first means 18 at 90 degree intervals around the annular ring 15, and in the same transverse plane as the first means. Accordingly, tubes 17 are essentially normal to the longitudinal movement of the inflated tubing through liquid applicator-smoother assembly 11. The flexible inner distribution tubes 17 are thus surrounded by the absorbent first means 18 so that the liquid must flow from the tubes 17 onto and around the inflate flexible tubing surface.

The Wicking Capability of the absorbent material (preferably comprising first means 18) allows the liquid to be distributed around the exterior wall of the inflated tubing. This absorbent first means 18 is also flexible and resilient so that it expands and contracts with the tubing whenever the inflated tubing diameter changes. Thus it allows inflated flexible tubing of varying diameter to remain in contact with the edge 19*a* as the tubing passes through inner circular opening 19 of first means 18.

The inner circular opening 19 is of slightly smaller diameter than the normal diameter of the inflated flexible tubing moving longitudinally therethrough. Preferably the diameter of the inner circular opening of the absorbent-type first means is between about 12% and about 20% smaller than the Normal Outside Diameter of the inflated tubing. If this relationship is less than about 12%, an under-inflated flexible tubing may not remain in contact with opening edge 19*a*. On the other hand, if it is more than about 20%, the inner opening 19 may be too small to allow the inflated tubing to freely pass through the opening. The relationship between these dimensions and the amount of liquid pressure in the inlet tubes 16 determines the amount of liquid which can be applied to the longitudinally moving tubing exterior wall.

Spaced downstream from liquid distribution applicator assembly 13 is second flexible and resilient means 20. In some liquid coating operations the second means may be formed of the same material as the first means and preferably has Wicking Capability. However, when liquid smoke is to be applied to the external surface of a cellulose tubing, the second means is preferably formed from flexible and resilient material without Wicking Capability.

In this particular embodiment second member 20 is preferably formed of an open-celled polyester foam. The open cellular foam member 20 is 0.5 inch (1.3 cm) thick and is provided with inner circular opening 28 of slightly smaller diameter than the outer diameter of the normal inflated flexible tubing.

Second means 20 is positioned between spacer 21 and retaining ring 22, which is in turn secured to housing 23.

The smoother assembly comprising elements 21, 22 and 23 is joined to the outer end of rotor 24 which is mechanically connected to drive mechanism 25. The entire assembly, with the exception of drive mechanism 25, is assembled within housing 26.

In operation, the inflated flexible tubing 27 is continuously moved in the longitudinal direction along a straight line as for example represented by its centerline axis X—X in FIG. 4, into the liquid applicator-smoother assembly 11.

The inflated tubing 27 first moves through the inner circular opening 19 of first flexible and resilient means 18 in a direction substantially normal to the opening diameter d—d and in rubbing contact with the opening edge 19*a* whose contacting surface is generally parallel with the inflated tubing exterior wall, ignoring irregularities in each surface. Simultaneously, liquid smoke flows inwardly as a multiplicity of discrete streams through inlet tubes 16 and joins flexible tubes 17 for discharge into the first means 18. The so-discharged liquid is absorptively dispersed between the discharge regions within the entire circumference of the absorptive material, and is distributed to edge 19*a* for application therefrom to the tubing wall.

As previously explained, this so-applied liquid has a tendency to flow to the underside of tubing 27 if the latter's longitudinal movement is horizontal. This can be avoided by moving the casing still in the same straight line X—X through rotating center opening edge 29 whose contacting surface is generally parallel with the inflated tubing exterior wall, ignoring irregularities in each surface. The rotating flexible and resilient second means' inner circular opening 28 is of slightly smaller diameter than the diameter of the inflated tubing exterior wall moving longitudinally therethrough with liquid thereon. In a preferred embodiment, the second flexible and resilient means' inner circular opening 28 is between about 4% and about 7% smaller than the Normal Outside Diameter of the inflated flexible tubing. The rotating opening edge 29 is in rubbing contact with the liquid-coated exterior wall and is displaced thereby, so as to simultaneously smooth the liquid coating as a continuous film of substantially uniform thickness on the tubing exterior wall. If the aforementioned diameter relationship is less than about 4%, the inflated tubing may not remain in sufficient contact with the second resilient means 20 to assure that the liquid will be smoothed uniformly. On the other hand, if it exceeds about 7%, the second resilient means 20 may act as a doctoring device and undesirably scrape off liquid instead of smoothing the liquid on the inflated tubing external surface as needed to give a substantially uniform liquid film coating.

The rotational speed of second flexible and resilient means 20 is selected on the basis of opposing considerations. It should be sufficient to aid in redistributing the liquid evenly onto the flexible tubing exterior surface. However, the rotational speed of second means 20 should not be so high as to cause centrifugal spin-off of the liquid from the inflated tubing exterior wall. For the illustrated and described embodiment, to apply a uniform liquid smoke coating to a cellulose tubing, a rotational speed of 200–250 RPM has been found suitable.

It is to be noted that the tar-depleted, concentrated, liquid smoke composition which is applied or "coated" on the casing surface, whether externally or internally, does not exist solely as a surface coating. Smoke color, odor and flavor constituents which are coated on the surface penetrate the cellulosic structure of the casing as the cellulose absorbs the moisture of the smoke solution. Inspection of the cross-section of the casing wall discloses a color degradation across the casing wall, with the smoke treated surface having a darker color than the surface on the opposite side of the casing wall. Accordingly, as used, herein, the term "coating" or "coated" is meant to apply to a casing wall that is not only coated with smoke constituents, but also is impregnated with smoke constituents.

The liquid smoke compositions of the invention may also contain other ingredients which may be suitably used in treatment of a tubular food casing, to which the smoke constituents are applied, e.g., glycerine and/or propylene glycol, and the like, may be used as humectants or softening agents.

Other ingredients which are normally used in the manufacture of, or for further treatment of the food casings, e.g. cellulose ethers and mineral oil, may also be present in the casing if desired, and they may be used in the same manner and amounts as if the liquid smoke composition of the invention had not been used.

In particular, agents for improving the peelability of the casings from food products such as sausages, e.g. frankfurters, bolognas and the like, may be optionally coated on the internal surface of the casings before or after the external application of tar-depleted, concentrated, liquid smoke composition to the casing, and before or during shirring. If the tar-depleted liquid smoke is applied to the casing internal surface, the peelability agent is preferably applied first. Such peelability enhancing agents include, but are not limited to, carboxymethyl cellulose, methyl cellulose, and other water soluble cellulose ethers, the use of which is disclosed in U.S. Pat. No. 3,898,348 issued Aug. 5, 1975 to Chiu, et al.; "Aquapel", a trademarked product, made by Hercules, Inc., Wilmington, Del., comprising alkyl ketone dimers, the use of which is further disclosed in U.S. Pat. No. 3,905,397 issued Sept. 16, 1975 to Chiu; and "Quilon", a trademarked product, made by E. I. DuPont de Nemours Co., Wilmington, Del., comprising fatty acid chromyl chlorides, the use of which is further disclosed in U.S. Pat. No. 2,901,358 issued Aug. 25, 1959 to W. F. Underwood et al.

The peelability enhancing agent may be applied to the internal surface of the tubular food casings by using any one of a number of well known methods. Thus, for example, the peelability enhancing agent can be introduced into the tubular casing in the form of a "slug" of liquid, in a manner similar to that disclosed, for example, in U.S. Pat. No. 3,378,379 issued Apr. 16, 1968 to Shiner et al. Advancing the casing past the liquid slug coats the inner surface thereof. Alternatively, the peelability enhancing agent may be applied to the internal surface of the casing through a hollow mandrel over which the casing is advancing as, for example, a shirring machine mandrel in a manner similar to that described in U.S. Pat. No. 3,451,827, issued June 24, 1969 to Bridgeford.

The method of this invention is also suitable for producing a printed casing, e.g., a casing having an insignia, trademark, lettering, and the like printed thereon, having smoke coloring and smoke flavoring constituents incorporated therein. Exemplary printed casings are disclosed in U.S. Pat. No. 3,316,189, issued Apr. 25, 1967 to Adams.

Casings prepared using the method of this invention are also suitable for the processing of what are conventionally known in the art as "dry sausages". Unlike other types of nonfibrous and fibrous casings which are preferably easy to peel from the food product, either by the food processor before sale to the customer or by the consumer, "dry sausage" casing preferably adheres to the food product during and after processing. "Kymene," a trademarked product, made by Hercules, Inc., which is a polyamide epichlorohydrin resin, the use of which is further disclosed in U.S. Pat. No. 3,378,379 issued Apr. 16, 1968 to Shiner et al., may optionally be coated on the internal surface of a casing treated with the smoke composition of the invention to improve the adhesion of the casing to food products processed therein.

The casings treated with the liquid smoke compositions of this invention can then be used in conventional processes for the processing of sausages and the like, and the smoke flavor and color constituents are transferred to the food stuff encased in the casing.

The invention will now be more clearly understood by reference to the following examples which are set forth as being merely illustrative of the invention and which are not intended, in any manner, to be limitative thereof.

In the following examples, the phenols and carbonyl content of liquid smoke were determined by the following procedure. All of the samples to be evaluated were prepared by filtering them through a Whatman No. 2 filter paper or equivalent, and refrigerating them as soon as possible after preparation to avoid possible polymerization. All samples were diluted with distilled water in two steps. In the first step, 10 ml of the sample was diluted to a total volume of 200 ml, and in the second step, 10 ml of the solution from the first step was further diluted to a total volume of 100 ml. For the determination of the phenols, 5 ml of the solution from the second step was further diluted in a third step with distilled water to a total volume of 100 ml. For carbonyl determination, 1 ml of the second solution was further diluted with carbonyl-free methanol to a total volume of 10 ml.

The procedure for the determination of the amount of phenols was a modified method for detecting the amount of phenols as 2,6-dimethoxyphenol based on the procedure described by I. W. Tucker in "Estimation of Phenols in Meat and Fat", JACAC, XXV, 779 (1942).

The reagents used for determination of the phenols were:

1. Boric acid-potassium chloride buffer having a pH of 8.3, made by diluting to 1 liter with distilled water.

a. 125 ml. of 0.4 Molar boric acid solution, b. 125 ml of 0.4 Molar potassium chloride solution, and c. 40 ml of 0.2 Molar sodium hydroxide solution, 2. 0.6 weight percent sodium hydroxide solution, 3. Color reagent, made by dissolving 0.25 g of N-2,6-trichloro-o-benzoquinoneamine in 30 ml of methanol and storing in a refrigerator until used, and 4. 2,6-dimethoxyphenol (DMP) standards, made by dissolving a known amount of DMP in a known amount of distilled water to form solutions of between 1 to 7 micrograms/ml. The procedure for the determination of the phenols was accomplished by following the steps below in order;

1. 5 ml of liquid smoke sample, or 5 ml DMP standard, or 5 ml of distilled water (for use as blank), were added to 5 ml of pH 8.3 buffer.

2. The pH was adjusted to 9.8 using 1 ml of sodium hydroxide solution.

3. Just before use, 1 ml of the color reagent was diluted to 15 ml with distilled water and 1 ml of the diluted color reagent was added to the test sample.

4. The color was allowed to develop for 25 minutes at room temperature.

5. The absorbance was determined at a wave length of 580 nm in a 1 cm colorimeter tube. The spectrophotometer was a Spectronic 20, Bausch and Lomb, Rochester, N.Y.

6. A standard curve was prepared from the data of the DMP standards with absorbance as the abscissa and concentrations of the standards as the ordinate. The equivalent concentrations of phenols as DMP in the liquid smoke samples were interpolated from this curve.

7. The amount of phenols as DMP concentration in mg/ml in the liquid smoke samples were calculated by using the equation, $$\frac{\text{ppm } DMP \text{ (from std. curve)} \times DF \times 0.001}{\text{vol. liq. smoke sample (ml)}} = DMP \text{ conc.}$$

where "DF" in the above equation is the dilution factor and "0.001" is a factor to convert micrograms to milligrams. To calculate the mg of phenols as DMP in a gram of liquid smoke, divide the above result by the weight of 1 ml of liquid smoke.

The procedure for calculating carbonyl compounds was a modified Lappan-Clark method for determining the equivalent amount of 2-butanone based on the procedure described in their article "Colorimetric Method for Determination of Traces of Carbonyl Compounds", *Anal. Chem.* 23, 541-542 (1959). The reagents used were:

1. Carbonyl-free methanol, prepared by adding 5 g of 2,4-dinitrophenylhydrazine (DNP) to 500 ml of methanol and a few drops of HCl, refluxing for three hours, and then distilling, 2. DNP solution, made by dissolving twice recrystallized DNP in carbonyl-free methanol to form a saturated solution. (The solution was stored in a refrigerator and it was prepared fresh every two weeks. It was prewarmed before use to insure saturation.)

3. KOH solution, made by dissolving 10 g KOH in 20 ml distilled water and diluting to 100 ml with carbonyl-free methanol, and 4. 2-butanone (methyl-ethyl-ketone) (MEK) standard solution, prepared by adding known amounts between 3 to 10 mg of MEK in 100 ml carbonyl-free methanol (used to make standard curve).

The procedure used for determining the amount of carbonyl compounds was as follows:

1. To 25 ml volumetric flasks containing 1 ml of DNP reagent add 1 ml of diluted liquid smoke solution, or 1 ml of standard MEK solution, or 1 ml of methanol (for reagent blank), 2. Add 0.05 ml of concentrated HCl to all 25 ml flasks, mix contents of each, and place in a water bath at 50° C. for 30 minutes, 3. Cool to room temperature and add 5 ml KOH solution to each, 4. Dilute contents of each flask to 25 ml with carbonyl-free methanol, 5. Using a Spectronic 20 spectrophotometer and 0.5×4 inch (1.27×10.2 cm) cuvettes, calibrate the spectrophotometer by reading at a wave length of 480 nm against the methanol blank and setting the absorbance at 0.

6. Using data for MEK, plot absorbance versus MEK concentration for standard curve, 7. Interpolate concentration of MEK equivalent in diluted liquid smoke solutions from this curve.

8. Calculate the carbonyl concentration as mg MEK/100 ml liquid smoke by the following equation:

$$\frac{\text{mg } MEK \text{ (from std. curve)} \times DF}{100 \text{ ml}} = \text{mg. } MEK \text{ per 100 ml liq. smoke}$$

where "DF" is the dilution factor. To calculate carbonyls as mg MEK/g liquid smoke, divide the result of the above equation by the weight (in grams) of 100 ml of the smoke being tested.

In the examples the Color Browning Index (CBI) was determined as follows:

(1) Prepare a phthalate buffer solution (pH 5.5) by diluting to 1000 ml with distilled water, 500 ml of 0.1M potassium hydrogen phthalate and 76 ml of 0.5M NaOH;

(2) Prepare a 2% Glycine buffer solution by dissolving 2 g of glycine in 100 ml of the pH 5.5 phthalate buffer;

(3) Add 10 ml of the phthalate buffer solution to a 20×150 mm test tube;

(4) Add 10 ml of the glycine buffer solution to another 20×150 mm test tube;

(5) Add 1.0 ml of distilled water and 10 ml of glycine to serve as a reagent blank;

(6) Cap the tubes with marbles and warm the tubes in a boiling water bath for 20 minutes;

(7) Dilute the liquid smoke solution to be tested with methanol at a ratio of 1 part liquid smoke to 50 parts methanol;

(8) To the tube containing the glycine buffer (reaction sample) and the tube containing the phthalate buffer only (unreacted control) add 1.0 ml of the diluted liquid smoke;

(9) Allow the color reaction to proceed at 100° C. for exactly 20 minutes, after which the tubes are removed from the boiling water bath and cooled in an ice bath for 2 minutes;

(10) Using the spectrophotometer with cuvettes 0.5 in (12.7 mm) diameter or equivalent, determine the optical density of the reaction sample and the unreacted control at a wave length of 400 nm, by reading against the glycine-water blank set at an optical density of 0.

(11) From the optical density of the reaction sample (ODR) and the optical density of the reacted control (ODU), determine the Color Browning Index (CBI) from the following formula:

$$CBI = [(ODR - ODU) + 0.14] \times \text{dilution factor} \times 0.65$$

The CBI is a measure of the quantity of potential color forming substances present per unit of liquid smoke.

EXAMPLE I

A tar depleted, concentrated, liquid smoke of this invention was made using a laboratory procedure. To about 17.8 liters of an as-is liquid smoke (Charsol® C-12, from Red Arrow Products Company, Manitowoc, Wis), were added 1800 milliliters of methylene dichloride, and the mixture was thoroughly mixed and allowed to settle. After the two phases separated, the tar rich solvent layer was decanted from the resultant aqueous tar-depleted liquid smoke fraction. The tar-depleted, liquid smoke fraction was divided into four nearly equal portions and each portion was placed into a shallow tray, 30.5 cm wide and 45.7 cm in length. The four trays with the liquid smoke solution therein were placed in a forced draft hood with a draft of air being blown across the surface of the solution in the trays for about 3 days. The temperature during this time was about room temperature (about 20° C. to 30° C.). In Table A are shown the initial weights of the tar-depleted liquid smoke (initial), the weights of the final concentrated, unneutralized liquid smoke (final), and the concentration ratio for each tray.

TABLE A

| Tray No. | Initial Weight (g) | Final Weight (g) | Conc. Ratio |
|---|---|---|---|
| 1 | 4147.1 | 1057.9 | 3.92 |
| 2 | 4542.6 | 1075.6 | 4.22 |
| 3 | 4819.2 | 1196.9 | 4.02 |
| 4 | 4710.8 | 1133.0 | 4.16 |

The concentration ratio for the entire sample was 4.08

The as-is smoke (as-is), the tar-depleted liquid smoke fraction (T-DF) and the tar-depleted, concentrated liquid smoke (T-DC) of the invention, were tested and chemically analyzed. The results are summarized in Table B. Shown are the total acidity in weight percent, the concentrations of phenols and carbonyls, and the Color Browning Index (CBI).

TABLE B

| Smoke Type | Total Acidity | Phenols (mg/ml) | Carbonyls (mg/ml) | CBI | Absorptive Power |
|---|---|---|---|---|---|
| As-is* | 11.8 | 13.4 | 134. | 10.5 | 0.4 |
| T-DF | 11.7 | 4.1 | 25.5 | 10.3 | 0.2 |
| T-DC | 23.5 | 5.4 | 675. | 34.2 | 0.7 |

*Average Value for "Charsol C-12"

The viscosity of the tar-depleted, concentrated liquid smoke (T-DC) was 95 centipoise at 25° C. While this is somewhat higher than that of water (1 cp), the solution is not noticeably more viscous.

The results shown in Table B demonstrate that the total acid content of the tar-depleted, liquid smoke fraction does not proportionally increase with concentration. Although the concentration ratio was about 4, the increase in total acid content was only somewhat over a factor of 2. This previously unknown and surprising fact allows the production of concentrated liquid smokes that can be neutralized without an undesirably large increase in the viscosity.

Another surprising result is the relative concentrations of the flavoring and coloring constituents in the tar-depleted, concentrated liquid smoke composition, as represented by the concentration of the phenols and the carbonyls. The concentration of the phenols, which is believed to contribute mostly to flavor, is decreased to a value of about one-third of the original smoke due to the extraction of the tars. The phenols, however, did not increase significantly with the concentration of the tar-depleted liquid smoke fraction. This is contrary to the expectation that phenolic flavor constituents would become too concentrated in a concentrated liquid smoke composition. A concentration higher than about 30 mg/ml will generally result in a strong, unpalatable taste for the treated food product. However, at concentrations below this amount, the phenols contribute to the desirable "smoke" taste.

The concentration of the carbonyl compounds, however, significantly and unexpectedly increased with concentration of the tar-depleted liquid smoke fraction. The concentration was more than an order of magnitude, and substantially greater than would be expected from the concentration ratio. This is very desirable since the carbonyls contribute to the coloring ability. Therefore, this unexpected increase is very desirable and contributes significantly to the superior coloring ability of the tar-depleted, concentrated, liquid smoke compositions of the invention, as shown by the CBI and the absorptive power.

Thus, we see illustrated by this example the superior properties of the tar-depleted, concentrated, liquid smoke compositions of this invention. The unexpected, but desirable, concentrations of the phenol and carbonyl constituents are believed to be due to chemical reactions and vapor/liquid equilibrium properties of the tar-depleted liquid smoke fraction that are not completely understood.

EXAMPLE II

Two samples of a concentrated, tar depleted, liquid smoke were made essentially by the laboratory process of Example I. The concentration ratio of each was about 4:1. One sample was left unneutralized, while the second was partially neutralized to a pH of about 5 by the addition of sodium hydroxide flakes. For comparison, a tar-depleted liquid smoke fraction, made by a solvent extraction process, was made by a procedure essentially as an Example I. Thereafter, the tar-depleted, liquid smoke fraction was partially neutralized to a pH of about 5, by the addition of sodium hydroxide pellets. This tar-depleted, preneutralized liquid smoke fraction was then concentrated by the laboratory procedure of Example I to a concentration ratio of about 4:1. The viscosity was measured using a Brookfield Viscometer Model LTV at 25° C. for each sample. The results are summarized in Table C. Shown are the viscosities and the pH values of the tar-depleted, concentrated, liquid smoke of this invention (T-DC), the tar-depleted, concentrated, partially neutralized liquid smoke of this invention (T-DCN), and the tar-depleted, preneutralized, concentrated liquid smoke (T-DNC).

TABLE C

| Liquid Smoke | pH | Viscosity (cp) |
|---|---|---|
| T-DC* | 2 | 95. |
| T-DCN* | 5 | 197.5 |
| T-DNC# | 5 | 1185. |

*Composition of this invention.
Comparison composition not of this invention.

As shown by the data in Table C, concentration of a liquid smoke that has been neutralized results in a composition of high viscosity. However, by practice of the invention, concentrated liquid smoke compositions can be made that have a low viscosity and can, therefore, be used easily in commercial process equipment.

EXAMPLE III

Samples of the concentrated, liquid smoke of the invention as well as a non-concentrated liquid smoke, for comparison, were prepared and the absorptive power of each was determined. Similar samples were also prepared and applied to a non-fibrous gel stock casing. The absorbance analysis results are shown in Tables D and E; liquid smokes in Table D and the casings in Table E. The liquid smokes were obtained by the laboratory procedure described in Example I.

The method and apparatus used to coat the tar-depleted, concentrated liquid smoke was the same as that shown in FIG. 4 and described in the above-cited U.S. 4,356,216.

In Table D are shown the concentration ratio and absorptive power of the liquid smoke compositions of this example. The values for absorptive power are the average values of two measurements. In Table E are shown the concentration ratio and absorptive index of the casings of this example. Liquid Smoke 1 of Table D was not concentrated and casing 1 of Table E was made using a nonconcentrated smoke.

TABLE D

| Number | Concentration Ratio | Absorptive Power |
|---|---|---|
| 1 | — | 0.238 |
| 2 | 2:1 | 0.318 |
| 3 | 3:1 | 0.510 |
| 4 | 3.5:1 | 0.723 |

TABLE E

| Number | Concentration Ratio | Absorptive Index |
|---|---|---|
| 1 | — | 0.152 |
| 2 | 3.5:1 | 0.333 |
| 3 | 4:1 | 0.319 |

These results show the enhanced coloring capability of the liquid smoke and casing of the invention. Both the absorptive power and the absorptive index are significantly higher for the tar-depleted, concentrated, liquid smoke compositions and coated casings of the invention, as compared with non-concentrated liquid smokes and casings treated therwith, thereby demonstrating the superior coloring ability of compositions and casings of this invention. The fact that the concentrated liquid smokes having this enhanced coloring ability can be made with a low viscosity and low phenolics, as is demonstrated in Examples II and III, is surprising.

EXAMPLE IV

Tar-depleted, concentrated, liquid smoke was made on a pilot scale using an agitated-film evaporator for the concentration.

A tar-depleted liquid smoke was first made. To a glass-lined Pfaudler Extractor Model 13.4-12 V-35, having a capacity of 500 gal (1890 liter), was added 3035 lb (341 gal) [1377 kg (1291 liter)] of Charsol ®C-12 liquid smoke, followed by 516 lb (46 gal) [234 kg (174 liter)] of methylene dichloride. The mixture was thoroughly mixed for 1 hour, after which the mixing was stopped and the phases were allowed to separate for one hour. The methylene dichloride tar-rich phase was pumped out of the bottom of the extractor, leaving 2892 lb (324 gal) [1312 kg (1226 liter)] of the final tar-depleted, liquid smoke fraction.

The tar-depleted liquid smoke fraction was concentrated using a Sybron/Pfaudler wiped-film evaporator having an area of 13.4 square feet (1.24 square meters) of evaporating surface and having a condenser with an internal area of 35 square feet (3.25 square meters). The evaporator was obtained from the Pfaudler Co., Division of Sybron Corp., Rochester, N.Y. and is described in their "Bulletin 1109, Pfaudler Wiped Film Evaporator".

The rate of the liquid smoke as delivered to the inlet port was such that a concentration ratio of about 4:1 was achieved. The operating conditions were controlled such that the liquid smoke was at no point heated above about 50° C. The evaporator jacket was heated using "Dowtherm A"®, heat exchanger fluid (Dow Chemical, Midland, Mich.) heated electrically to 50° C. The tar-depleted liquid smoke made above was fed to the inlet port at an average rate of 42 pounds per hour (19 kilograms per hour). A total of about 730 pounds (330 kilograms) of concentrated, tar-depleted, liquid smoke was produced to give a concentration ratio of about 4:1. The evaporation was done under a reduced pressure of 25 mm Hg absolute (3300 Pascals).

EXAMPLE V

Frankfurters were prepared in casings treated with tar-depleted, concentrated, liquid smoke and the coloring ability of the treated casings was determined.

A tar-depleted liquid smoke was prepared as in Example I, and it was applied to a nonfibrous gel stock casing using the method described in Example III. The casings were dried and shirred, and then stuffed and processed by the conventional steps of cooking, cold water showering, and chilling, but without the conventional step of smoke treatment. The processing conditions were sufficient to cause the transfer of smoke color, odor, and flavor constituents from the casing to the encased frankfurter. The frankfurters were then peeled and the colorimetric values "a" and "L" were determined.

Three meat emulsions were tested, two beef/pork emulsions, identified as Emulsions BP-1, and BP-2, and a turkey emulsion, identified as Emulsion T. BP-1 and BP-2 were made using the same formulations using different sources of meat. In Tables F and G are shown the formulations used for the emulsions.

In Table H are shown the colorimetric values obtained from the loadings of liquid smoke and the emulsions shown. The colorimetric values were obtained using a Gardner XL-23 Colorimeter with a 1 cm aperture standardized with a white plate, all in accordance with the standard operating procedures described in the instruction manual for the Gardner XL-23 Tristimulus Colorimeter, which is commonly used in industry for the measurement of color.

For each meat emulsion and loading, several frankfurters were tested. Three locations on each frankfurter tested were selected for measurement. Measurement locations were approximately 2.5 cm from the end of the frankfurter and in the middle. The frankfurters were turned 180 degrees and measured in those same locations. For each emulsion a control using a casing that was not treated with liquid smoke was made and tested.

"L" and "a" measurements were obtained. The "L" value measures lightness and darkness, the higher values representing a lighter color. The "a" values measure redness, the higher the value indicating a redder product.

The loadings in Table H are the "effective loadings" of the liquid smoke solution or the equivalents to loadings of a nonconcentrated smoke. For example, a loading of 1.5 mg/cm$^2$ of a 4:1 concentrated liquid smoke solution is an effective loading of $1.5\times4=6.0$ mg/cm$^2$.

TABLE F

Beef/Pork Emulsion
Emulsions BP-1 and BP-2

| Ingredients | Weight (kg) |
|---|---|
| Beef Chuck | 22.68 |
| Regular Pork Trimmings | 22.68 |
| Water/Ice | 9.07 |
| Salt | 1.13 |
| Spice | 0.45 |
| Prague Powder (Sodium Nitrite) | 0.06 |

TABLE G

Turkey Emulsion
Emulsion T

| Ingredients | Weight (kg) |
|---|---|
| Mechanically Deboned Turkey | 45.36 |
| Water/Ice | 4.54 |
| Salt | 1.13 |
| Spice | 0.45 |
| Prague Powder (Sodium Nitrite) | 0.13 |

TABLE H

Colorimetric Data

| Emulsion | Loading (mg/cm$^2$) | L | ΔL | a | Δa |
|---|---|---|---|---|---|
| T | 0 | 49.5 | — | 14.8 | — |
| T | 5.87 | 45.1 | −4.4 | 15.9 | 1.1 |
| BP-1 | 0 | 50.9 | — | 16.2 | — |
| BP-1 | 5.87 | 48.2 | −2.7 | 16.8 | 0.6 |
| BP-2 | 0 | 52.1 | — | 14.3 | — |
| BP-2 | 5.87 | 48.6 | −3.5 | 15.0 | 0.7 |

The results of the tests shown in Table H show how the tar-depleted, concentrated, liquid smoke of the invention can be used to obtain a desirably dark meat product. The meat emulsions used were relatively light emulsions, and by practice of the invention these emulsions were colored to an extent impractical with non-concentrated liquid smoke, using the same type of casing. Using an unconcentrated, tar-depleted liquid smoke, a loading upon a nonfibrous casing of only about 10 mg/in$^2$ (1.55 mg/cm$^2$) is possible in one application of liquid smoke. Thus to obtain a higher loading on a nonfibrous casing, one must resort to the impractical method of applying the liquid smoke to the casing with two or more applications. Using the concentrated, tar-depleted, liquid smoke of the invention, higher loadings are possible with only one application, allowing for greater flexibility and ease in obtaining a desired high coloring ability for use with light meat emulsions.

EXAMPLE VI

A tar-depleted, concentrated liquid smoke was made essentially as in Example I. The final pH of the tar-depleted, liquid smoke was about 2.2 and the concentration ratio was about 4:1. Portions of the tar-depleted, concentrated, liquid smoke were partially neutralized with an amount of NaOH pellets to give three samples of tar-depleted, concentrated, neutralized, liquid smoke having pH values of about 4, 5, and 7 respectively. Additionally, samples of unconcentrated, tar-depleted liquid smoke were partially neutralized and then concentrated essentially as in Example I. The viscosity of the samples was measured at about 25° C. and the results are summarized in Table I and FIG. 5. In Table I are shown the pH values and the viscosities of the liquid smoke solutions made. The viscosity was measured using a Brookfield Synchro-Lectric Viscometer Model LTV. For Samples 1 to 5, a No. 1 spindle was used, for Sample 6 a No. 3 spindle was used. For samples 1 to 3, and 6, the speeds of the spindle were 30 and 60 rpm, for Sample 4, 6 rpm and 12 rpm and Sample 5, 12 rpm and 30 rpm. Sample 1 was unneutralized, Samples 2 to 4 were concentrated, then neutralized, and Samples 5 to 7 were neutralized, then concentrated.

TABLE I

| Sample | pH | Viscosity (cp) |
|---|---|---|
| 1 | 2.17 | 20 |
| 2 | 4.02 | 35 |
| 3 | 5.00 | 60 |
| 4 | 6.94 | 290 |
| 5 | 4 | 125 |
| 6 | 5 | 1190 |
| 7 | 7 | Gellation |

Figure 5:
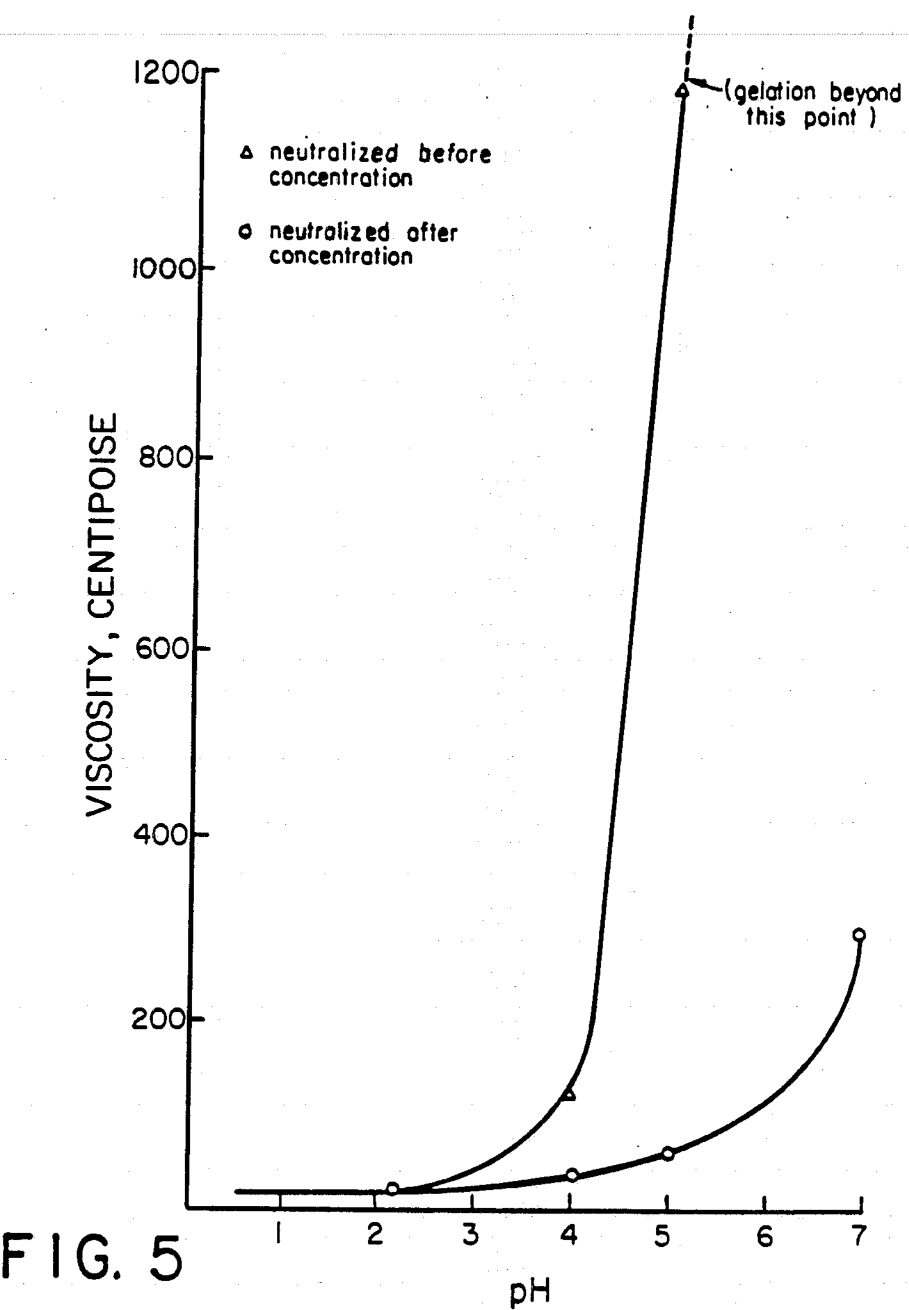
FIG. 5 is a graph showing the viscosity and the pH of liquid smoke solutions of the invention and also of liquid smoke solutions that were concentrated after they were neutralized.

As seen from Table I and FIG. 5, the viscosities of the samples neutralized before concentration were dramatically higher than those samples made according to the invention, wherein an unneutralized liquid smoke was concentrated. Attempts to concentrate a tar-depleted, liquid smoke having a pH higher than about 5 was impossible due to gellation of the liquid smoke as it was being concentrated, whereas the tar-depleted, concentrated, neutralized liquid smoke samples made according to the invention had viscosities sufficiently low to be commercially useful.

EXAMPLE VII

The liquid smoke composition prepared according to Example IV was partially neutralized to a pH of 4 under conditions where the temperature of the solution was maintained below 40° C. This liquid smoke solution was applied on a production scale to a gel-stock nonfibrous casing at a level of about 10 milligrams per square inch (1.55 milligrams per square centimeter) according to the method and apparatus described in previously cited U.S. Pat. No. 4,356,216. The final casing yielded finished frankfurters having good smoke color, which was significantly darker than the color of either the frankfurters made in a non-smoked control casing, or in a similarly produced unconcentrated smoke treated casing.

We claim:

1. A method for imparting smoke color, odor, and flavor to a foodstuff comprising contacting a surface of a food casing with a tar-depleted, concentrated, liquid smoke composition having a total acid content less than about 40 weight percent, made by contacting an aqueous, substantially unneutralized, tar-containing, liquid smoke solution and a liquid solvent at a volume ratio of about 1:1 to about 65:1, respectively, under conditions to form a tar-enriched, liquid solvent fraction and an aqueous, substantially unneutralized, tar-depleted, liquid smoke fraction, the tar-depleted, liquid smoke fraction having an absorptive power of at least about 0.15 at a wave length of 340 nm and a light transmittance of at least about 50%, the tar-containing liquid smoke solution having an absorptive power of at least about 0.25 at a wave length of 340 nm, the liquid solvent being nonreactive with the liquid smoke solution or reactive with the liquid smoke solution to form a derivative liquid solvent, the liquid solvent being immiscible in the liquid smoke solution, the liquid solvent having a hydrogen bonding solubility parameter in the environment of the liquid smoke solution of at least about 2.7; separating the tar-depleted, liquid smoke fraction from the tar-enriched liquid solvent fraction, and concentrating the tar-depleted, liquid smoke fraction at a temperature less than about 70° C. to a concentration ratio of between about 2:1 to about 5:1 to form the tar-depleted, concentrated, liquid smoke composition, said thus-treated food casing having an absorptive index of from about 0.25 to about 0.9 at a wavelength of 340 nm; stuffing said casing with a foodstuff; and processing said casing with said foodstuff therein under conditions sufficient to transfer smoke color, smoke odor, and smoke flavor constituents from said casing to the encased foodstuff.

2. A method for imparting smoke color, odor, and flavor to foodstuff comprising contacting a surface of a food casing with a tar-depleted, concentrated, liquid smoke composition, derived from a substantially unneutralized, tar-depleted liquid smoke fraction having an absorptive power of at least about 0.15 at a wavelength of 340 nm and a light transmittance of at least about 50%, the liquid smoke fraction having been concentrated at a temperature of less than about 70 C. to a concentration ratio of between about 2:1 and 5:1, said tar-depleted, concentrated, liquid smoke composition having a total acid content less than about 40 weight percent and a viscosity less than about 500 centipoise at 25° C., said thus-treated food casing having an absorptive index of from about 0.25 to about 0.9 at a wavelength of 340 nm, stuffing said casing with foodstuff, and processing said casing with said foodstuff therein under conditions sufficient to transfer smoke color, smoke odor, and smoke flavor constituents from said casing to the encased foodstuff.

3. A method for imparting smoke color, odor, and flavor to a foodstuff comprising contacting a surface of a food casing with a partially neutralized tar-depleted, concentrated, liquid smoke composition derived from a substantially unneutralized tar-depleted liquid smoke fraction having an absorptive power of at least about 0.15 at a wavelength of 340 nm and a light transmittance of at least about 50%, the liquid smoke fraction having been concentrated at a temperature of less than about 70° C. to a concentration ratio of between about 2:1 and 5:1, said tar-depleted, concentrated, liquid smoke composition having a total acid content less than about 40 weight percent and a viscosity less than about 500 centipoise at 25° C., said thus-treated food casing having an absorptive index of from about 0.25 to about 0.9 at a wavelength of 340 nm, stuffing said casing with foodstuff, and processing said casing with said foodstuff therein under conditions sufficient to transfer smoke color, smoke odor, and smoke flavor constituents from said casing to the encased foodstuff.

4. A method for imparting smoke color, odor, and flavor to a foodstuff comprising contacting a surface thereof with a tar-depleted, concentrated, liquid smoke composition having a total acid content less than about 40 weight percent, made by contacting an aqueous, substantially unneutralized, tar-containing, liquid smoke solution and a liquid solvent at a volume ratio of about 1:1 to about 65:1, respectively, under conditions to form a tar-enriched, liquid solvent fraction and an aqueous, tar-depleted, substantially unneutralized, liquid smoke fraction, the tar-depleted, liquid smoke fraction having an absorptive power of at least about 0.15 at a wave length of 340 nm and a light transmittance of at least about 50%, the tar-containing liquid smoke solution having an absorptive power of at least about 0.25 at a wave length of 340 nm, the liquid solvent being nonreactive with the liquid smoke solution or reactive with the liquid smoke solution to form a derivative liquid solvent, the liquid solvent being immiscible in the liquid smoke solution, the liquid solvent having a hydrogen bonding solubility parameter in the environment of the liquid smoke solution of at least about 2.7; separating the tar-depleted, liquid smoke fraction from the tar-enriched liquid solvent fraction, and concentrating the tar-depleted, liquid smoke fraction at a temperature less than about 70° C. to a concentration ratio of between about 2:1 to about 5:1 to form the tar-depleted, concentrated, liquid smoke composition.

5. A method for imparting smoke color, odor, and flavor to a foodstuff comprising contacting a surface thereof with a tar-depleted, concentrated, liquid smoke composition derived from a substantially unneutralized, tar-depleted liquid smoke fraction having an absorptive power of at least about 0.15 at a wavelength of 340 nm and a light transmittance of at least about 50%, the liquid smoke fraction having been concentrated at a temperature of less than about 70° C. to a concentration ratio of between about 2:1 and 5:1, said tar-depleted, concentrated, liquid smoke composition having a total acid content less than about 40 weight percent and a viscosity less than about 500 centipoise at 25° C.

* * * * *